Figure 1:
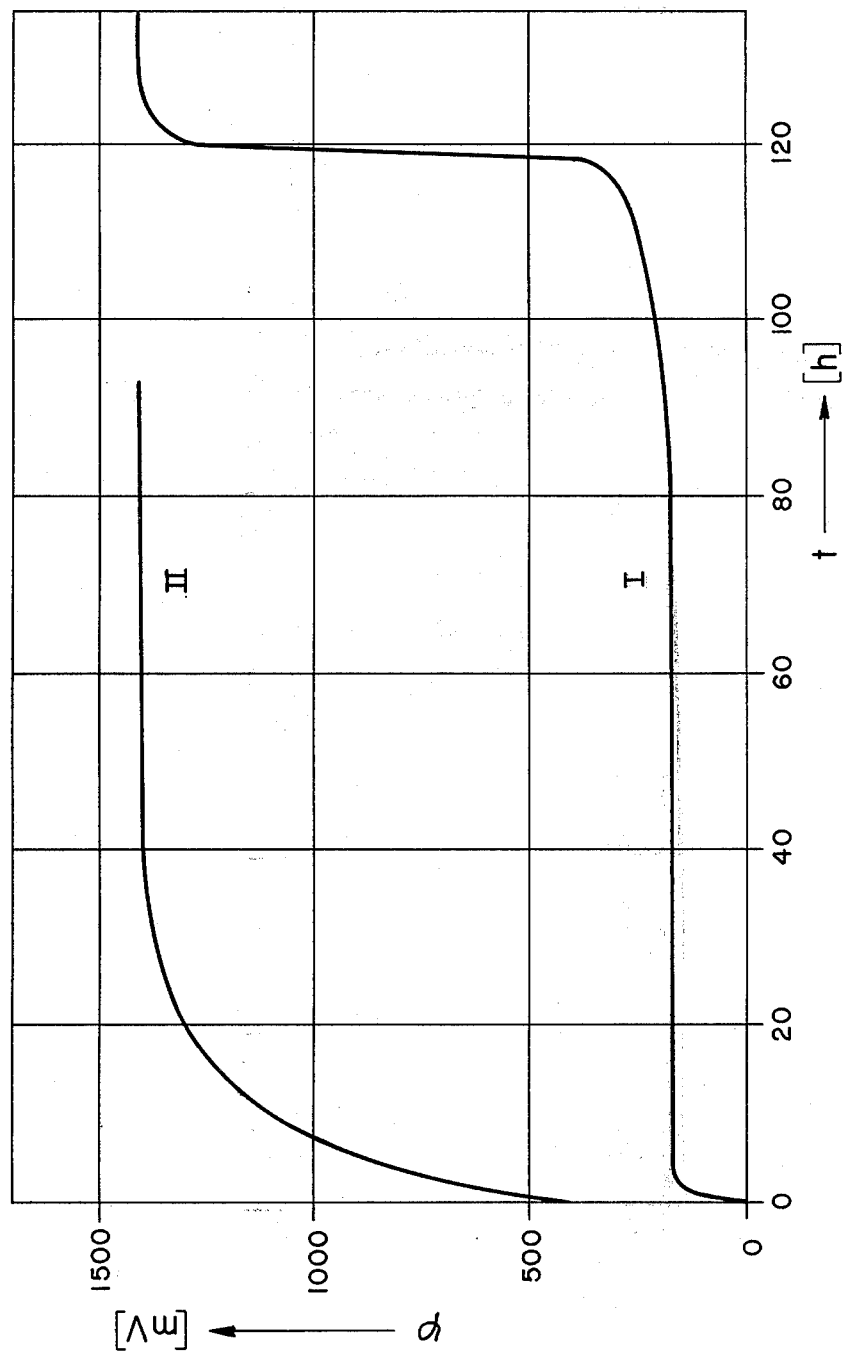

United States Patent [19]
Bauer et al.

[11] 3,959,014
[45] May 25, 1976

[54] METHOD TO PRODUCE A PROTECTIVE OXIDE ON THE SURFACE OF POSITIVE NICKEL ELECTRODES FOR GALVANIC CELLS

[75] Inventors: Martin Bauer; Henning Ewe, both of Braunschweig; Eduard Justi, Schapen, all of Germany

[73] Assignees: Varta Batterie Aktiengesellschaft; Siemen AG, Kelkheim, Taunus, Germany; part interest to each

[22] Filed: Dec. 14, 1972

[21] Appl. No.: 315,219

[30] Foreign Application Priority Data
Dec. 14, 1971   Germany............................ 2161898

[52] U.S. Cl.................................... 136/29; 137/75
[51] Int. Cl.² ........................................ H01M 35/18
[58] Field of Search ................. 136/120 FC, 28–29, 136/75, 76, 120 R, 64; 204/290 R

[56]         References Cited
         UNITED STATES PATENTS

| | | | |
|---|---|---|---|
| 3,436,267 | 4/1969 | Faber | 136/29 |
| 3,582,403 | 6/1971 | Owen | 136/24 |

FOREIGN PATENTS OR APPLICATIONS

| | | | |
|---|---|---|---|
| 169,618 | 7/1965 | U.S.S.R. | 136/29 |
| 179,361 | 5/1966 | U.S.S.R. | 136/29 |
| 244,453 | 10/1969 | U.S.S.R. | 136/29 |

*Primary Examiner*—Anthony Skapars
*Attorney, Agent, or Firm*—James F. Jones

[57]         ABSTRACT

The present invention relates to a method for the development of a protective oxide on the surface of porous, positive Mi-electrodes for galvanic cells with alkaline electrolyte.

4 Claims, 3 Drawing Figures

FIG. I

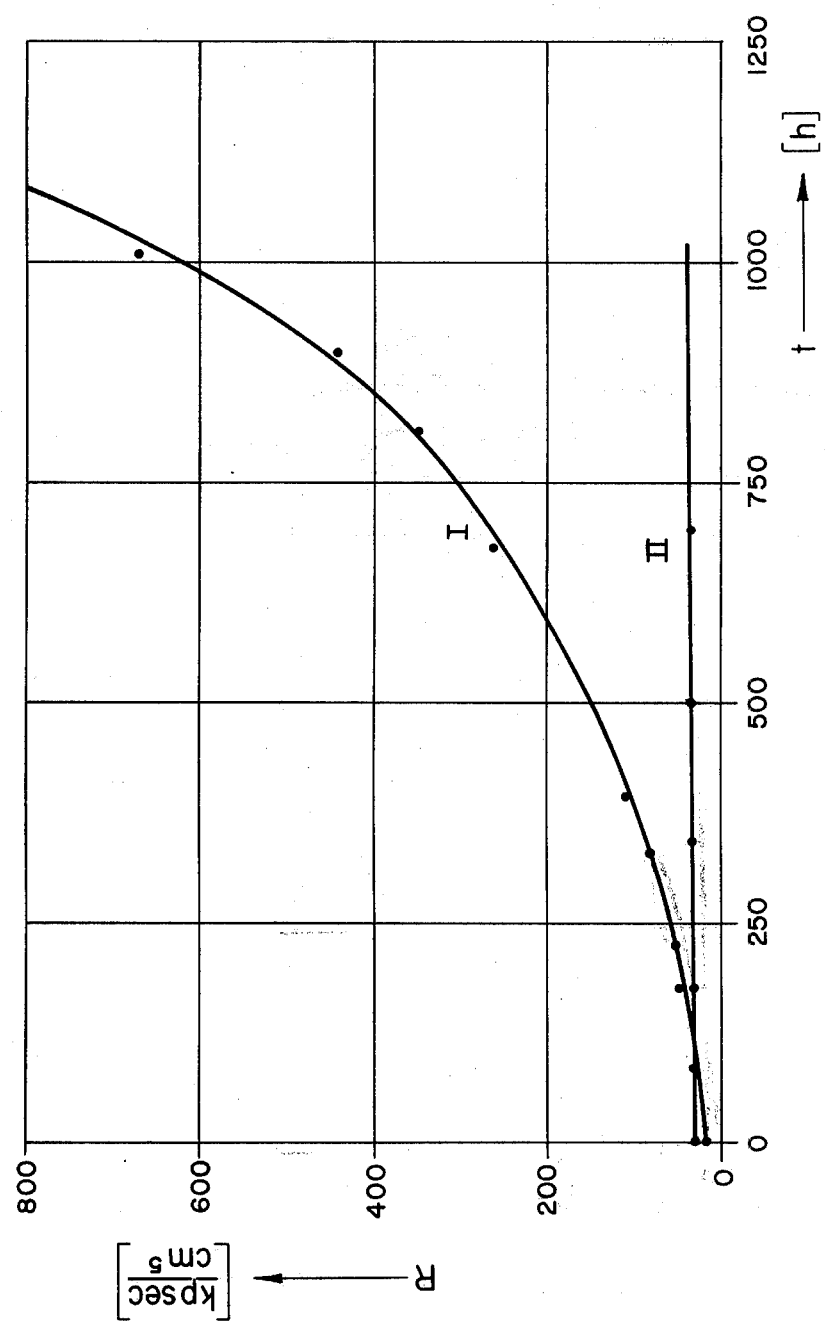

METHOD TO PRODUCE A PROTECTIVE OXIDE ON THE SURFACE OF POSITIVE NICKEL ELECTRODES FOR GALVANIC CELLS

For the positive electrode of fuel cells, electolyzers, and accumulators with alkaline electrolytes a porous Ni-structure is necessary, in which the active mass of accumulators or the catalyzer of electrolyzers or fuel cells is embedded. This porous Ni-structure is preferably produced from carbonyl-nickel by sinter-operation or heat-pressure. At ambient temperatures, this carbonyl-nickel structure meets the required conditions at the best; at higher temperatures of about 40°–100°C, however, Ni begins to oxidize and develops voluminous Ni-hydroxide. This developing of hydroxide occurs only on the surface of the Ni-structure, thus, the electrical conductivity is not considerably changed by this oxidation; whereas, the porosity of the Ni-structure is strongly reduced by this process because the specific volume of $Ni(OH)_2$ is about three times greater than one of nickel.

Subsequently, the pores of the electrodes incrust continuously during a longer operation time, whereby, an increased polarization is caused. The deterioration of the positive electrode by incrusted pores occurs quite rapidly when the electrode consists not only of one layer, but comprises additionally a fine porous cover layer of carbonyl-nickel, i.e., the double-skeleton-catalyst-electrodes in fuel cells. In this latter case, the pores of the covering and the working layers incrust, whereby, a considerable increasing of the polarity occurs and the working life of the electrodes is reduced to an extent which is inacceptable in the economical view.

A similar problem appears at $H_2O_2$ fuel cells according to Bacon, which are operated with high concentrated alkaline electrolytes at temperatures of about 200°–300°C. The $O_2$-electrodes of Ni, which are used in these cells, are immediately oxidized to NiO at these high temperatures. This oxide has a very poor electrical conductivity so that the electrical resistance of these electrodes is increased. Therefore, an electrically conductive and protective oxide has to be produced on the surface of these electrodes, which are impregnated with lithium and tempered at 500°–700°C, whereby a lithium-nickel oxide is produced on the surface, which exhibits the required properties and which increases in addition the catalytic activity of the electrodes. The further oxidation of the nickel can be reduced in fuel cells of this type.

In galvanic cells with aqueous electrolytes the temperature amounts maximal to about 120°C. This is too low for an oxidation of the Ni-structure to NiO, it is rather oxidized to the voluminous $Ni(OH)_2$. This $Ni(OH)_2$ shows a metallic conductivity, but the incrusting of the pores has to be prevented.

According to this invention, the production of $Ni(OH)_2$ can be avoided when a thin cover of NiO is produced on the surface of the electrodes before operating. This cover of NiO prevents the oxidation of Ni to $Ni(OH)_2$.

The NiO-surface can be produced by tempering the electrodes in air or oxygen. The temperature should amount to at least 160°C so that the protective oxide layer can reach a sufficient density. To avoid an incrusting of the electrode-pores by NiO following a too strong tempering, the temperature during the tempering in oxygen or air should not exceed the limit of 400°C. To attain a uniform oxidation of the surface of the porous electrode the tempering time is to continue half an hour at least, but can be considerably prolongated if necessary. At the presence of silver containing catalysts the tempering can preferably be performed in oxygen at temperatures between 160°–220°C.

The NiO-cover can also be produced by other methods, for example, a thin cover of $Ni(OH)_2$ is produced on the Ni-surface by chemical or electro-chemical way. This cover should have a thickness of 5–30 molecular layers. This hydroxide is then decomposed by tempering to NiO. The temperature during the tempering process has to be 160°C at least because the decomposition from $Ni(OH)_2$ to NiO begins only at this temperature.

The object of the invention is practically described in the following examples:

EXAMPLE I

A porous electrode of 10 g carbonyl-nickel T 255, with a diameter of 40 mm, is sintered in a reducing atmospher at 800°C. This electrodes is divided into halves and one half is tempered at 35°C for half an hour in air to produce NiO on its surface. Both electrode halves are afterward slowly galvanostatic oxidized with 2 mA in the usual half-cell method. The potentials are shown in FIG. 1 as a function of the time. The different length of the $Ni(OH)_2$ phase of both electrodes is clearly realised. The untempered electrode I shows a distinguished hydroxide phase of about 25 mAh/g, whereas, the electrode II covered by NiO forms nearly no hydroxide even if the development of $O_2$ on the electrode is lasting for a longer period.

EXAMPLE II

At $O_2$-double-skelton-catalyst-cathodes for fuel cells, which contain Raney silver, the simplest and technically most interesting method to produce a protective NiO cover is the tempering of the electrodes in air to oxidize the Ni surface to NiO. The temperature for this tempering is preferably about 200°C, because the activated Raney silver of the $O_2$ electrodes does not, or only slightly, re-cristallize the $Ni(OH)_2$ existing on the electrodes is only decomposed to NiO above 160°C. If the tempering is too short, too little NiO will be produced. Tempering during a longer period can produce so much NiO that the pores are already incrusted by NiO. The following series of measurements have been performed to find out the optimal tempering time at the temperature of 200°C for $O_2$-cathodes:

A thin (0.3 mm) fine-porous plate of sintered carbonyl-Ni-powder has been cathodically reduced at 60° C in 6 n KOH during 48 hours to remove eventually present NiO-covers. The cathode has been washed in distilled water, dried and cut into ten equal parts. These parts have been tempered at 200° C in air for different periods and afterwards electrochemically oxidized to determine in which extent these electrodes can still be oxidized to $Ni(OH)_2$ after the tempering.

Figure 2:
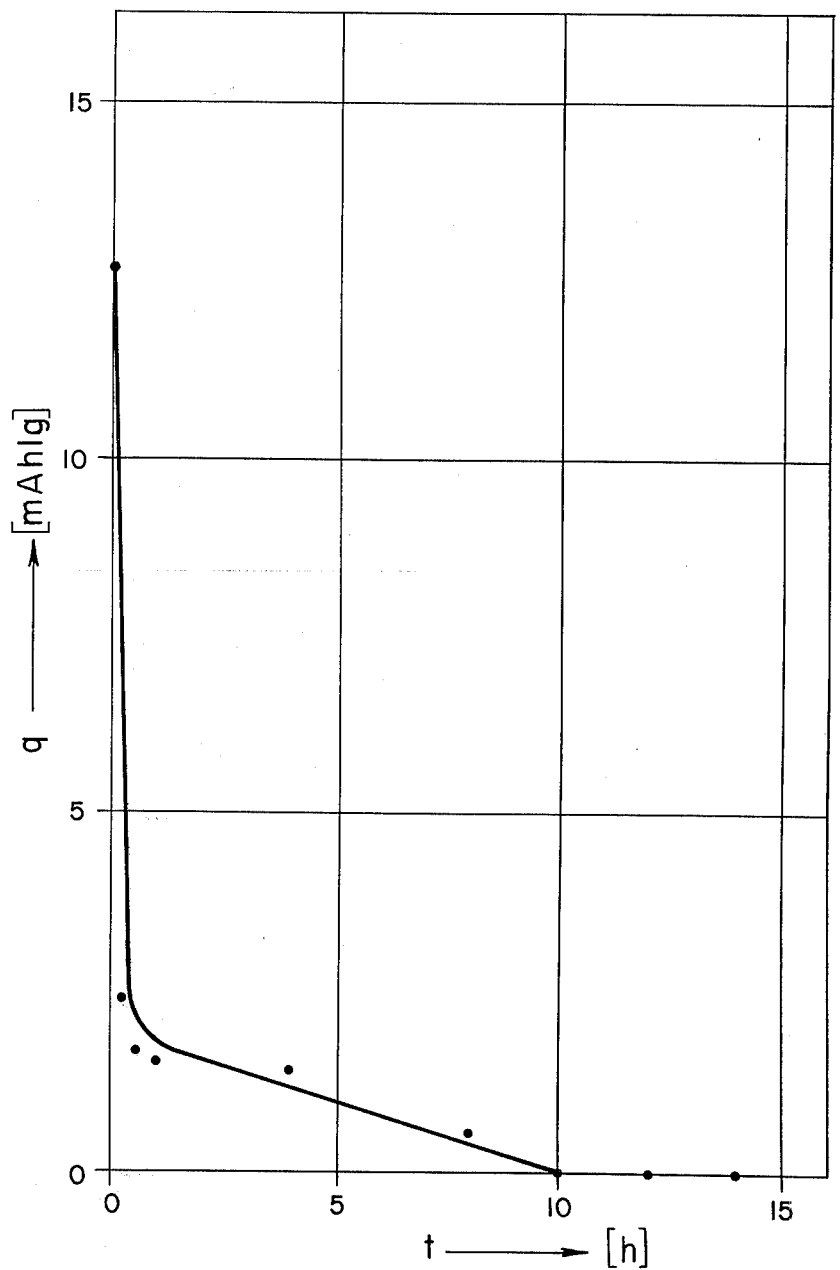

This electrochemical oxidation, in order to provide $Ni(OH)_2$, which is a reciprocal measure for the quality of the produced NiO-cover, is shown in FIG. 2 as function of the tempering time. It can be seen that at a tempering time of ten hours the oxidation is already too little to be measured by the galvanostatic method. For the tempering of thin Ni-electrodes for producing a NiO-cover, a tempering time of about 10 hours in air at a temperature of about 200° C is sufficient.

EXAMPLE III

Real complete $O_2$-electrodes should be tempered in pure oxygen, in contrary to Example II, where only 3mm- plates are treated. Otherwise, in these thicker multilayer-electrodes nitrogen cushions can be formed which render the diffusion between the atmospheric oxygen and the zone of carbonylnickel in the midst of the electrode difficult and prevent by this the production of a dense protective NiO-cover.

To test the method with complete $O_2$ electrodes, two bilateral operating oxygen-electrodes of 40 mm diameter were heat pressed with 1 to/cm². Each electrode consisted of two fine-porous cover layers of carbonylnickel and of a coarse-pored operating layer of a mixture of carbonylnickel, Raney silver, and a soluble pore forming agent. After heat pressing the aluminum was dissolved out of the Raney silver. Then, the electrodes were tempered in oxygeny atmosphere at 200° C for eight hours. At long duration tests at 60° C an untempered electrode showed an apparent aging or a growing of polarization, respectively. The test showed that this aging is caused by an incrusting of the fine pores of the cover layers and the working layer. FIG. 3 shows the resistance to flow of the electrolyte of a tempered and the untempered electrode as function of time during this test. The increasing of the resistance to flow shows an incrusting of the pores. The tempered electrode II shows from the very first a higher resistance to flow, which is caused by the NiO cover produced during the tempering.

The resistance to flow of tempered electrodes increases only slowly, even at a longer working time, whereas the resistance to flow of the untempered electrode I increases to the 20-fold of the initial value, already after 1,000 hours working time.

EXAMPLE IV

A sintered electrode according to Example I is treated with a 5% solution of $H_2O_2$ for 10 minutes, whereby a $Ni(OH)_2$ cover is developed on the Ni-surface. This $Ni(OH)_2$ is then decomposed to NiO in vacuum at 200° C. The electrode treated in such a manner can develop nearly no further $Ni(OH)_2$ in 6n KOH at 80° C even during continuous $O_2$-development, the pores therefore do not incrust and maintain their effective pore-profile.

EXAMPLE V

An electrode manufactured according to Example I is electrochemically anodic oxidized with 1 mA/g to form $Ni(OH)_2$ on the Ni-surface. About 1/60 to 1/30 of the possible $Ni(OH)_2$ capacity is already sufficient. $Ni(OH)_2$ is decomposed to NiO after drying the electrode by tempering for 1 hour in air at 300° C. An electrode provide with protective oxide in such a manner does no more produce $Ni(OH)_2$ in an alkaline electrodlyte and its pores do no more incrust.

Having now described the means by which the objects of the invention are obtained,

We claim:

1. The method for the production of a thin protective layer of nickel oxide on the surface of a porous nickel electrode for use in a galvanic cell comprising contacting the nickel electrode to a chemical or electro-chemical processing to form a film of 5–30 molecular layers thickness of nickel hydroxide thereon, contacting said electrode with an oxygen containing atmosphere to decompose the nickel hydroxide layer to the desired nickel oxide, contacting the nickel electrode with an oxygen containing atmosphere at a temperature in the range of 160°–400°C and for a period of time of at least half an hour and thereafter recovering a nickel electrode having a thin protective film of nickel oxide on the surface thereof.

2. The method in accordance with claim 1, wherein the atmosphere is air.

3. The method in accordance with claim 1 wherein the atmosphere is substantially pure oxygen.

4. The method in accordance with claim 1, wherein the atmosphere is substantially pure oxygen and the temperature employed is in the range 160°–220°C and said contacting is carried out in the presence of a silver containing catalyst.

* * * * *